United States Patent [19]

Steege et al.

[11] Patent Number: 5,660,228

[45] Date of Patent: Aug. 26, 1997

[54] MODULAR AIR-TO-AIR HEAT EXCHANGER

[75] Inventors: Douglas C. Steege; Charles Gates, both of Madison, Wis.

[73] Assignee: Altech Energy, Madison, Wis.

[21] Appl. No.: 570,841

[22] Filed: Dec. 12, 1995

[51] Int. Cl.⁶ .................................................. F28F 9/22
[52] U.S. Cl. .................. 165/76; 165/166; 165/145
[58] Field of Search .................................. 165/145, 165, 165/166, 76, 78

[56] References Cited

U.S. PATENT DOCUMENTS

| | | | |
|---|---|---|---|
| 1,825,498 | 9/1931 | Wogan | 165/166 X |
| 2,752,950 | 7/1956 | Coulters | 165/76 X |
| 4,327,803 | 5/1982 | Muellejans et al. | 165/166 |
| 5,002,118 | 3/1991 | Olmstead et al. | 165/166 X |
| 5,072,790 | 12/1991 | Lapowsky | 165/166 |
| 5,193,610 | 3/1993 | Morissette et al. | 165/166 X |
| 5,271,459 | 12/1993 | Daschmann | 165/166 |

FOREIGN PATENT DOCUMENTS

| | | | |
|---|---|---|---|
| 2631092 | 1/1978 | Germany | 165/166 |
| 49666 | 4/1979 | Japan | 165/145 |
| 2060 | 7/1981 | WIPO | 165/166 |

*Primary Examiner*—Leonard R. Leo
*Attorney, Agent, or Firm*—Quarles & Brady

[57] ABSTRACT

A modular air-to-air heat exchanger is provided in which heat exchanger cores are assembled in stacks from elemental core blocks that may be locked to a limited number of panels which form a variable size enclosure for the cores. Single and double width panels, half the height of the stacks, allow a staggering panel insertion which segregates crossing input and exhaust streams for an arbitrary configuration of cores.

7 Claims, 6 Drawing Sheets

FIG 6

MODULAR AIR-TO-AIR HEAT EXCHANGER

FIELD OF THE INVENTION

The present invention relates to air-to-air heat exchangers and, in particular, to a modular design allowing a heat exchanger of arbitrary capacity to be constructed from a limited set of standard elements.

BACKGROUND OF THE INVENTION

Constructing a building with improved energy efficiency often involves reducing the amount of air leaking between the inside and outside of the building. In the summer, infiltrating hot air increases cooling costs, in the winter, infiltrating cold air increases heating costs.

Unfortunately, buildings with substantially reduced air leakage may have undesirably high levels of indoor air pollution. Concentrations of carbon dioxide (from occupant respiration) formaldehyde (from building materials), radon, carbon monoxide, and vapors from cleaning solvents and the like, can rise to unacceptable levels if the building is not properly ventilated.

This apparent dilemma can be resolved with the use of an air-to-air heat exchanger which can increase ventilation without undoing the energy efficiency gains provided by building a "tight" structure. With such a heat exchanger, air exhausted from the building flows in close thermal proximity to incoming fresh air, separated only by the walls of the heat exchanger air conduits. Thus, in the winter, the heat from the warm air being exhausted is transferred, in part, to the cool air drawn in from the outside reducing the net heat loss. In the summer, the heat from the warm air being drawn in from the outside is, in part, transferred to the cool air being exhausted, reducing the net heat load on the air conditioning system.

The efficiency of an air-to-air heat exchanger depends in part on the amount of surface area shared between conduits of incoming and outgoing streams of air. Larger surface area increases the amount of heat flow between the opposed air streams. For this reason, a well designed heat exchanger core will separate the incoming and outgoing air streams into many alternating and interwoven channels to increase the surface area shared between the streams.

A "cross flow" heat exchanger core is generally block shaped comprised of many horizontal conductive plates dividing the air flow into many layers. Outgoing air passes along even layers at right angles to incoming air passing along odd layers. The perpendicular air flows help in segregating flow streams before and after they pass through the core. Such air-to-air heat exchanger cores are manufactured in various sizes by a number of manufacturers. Some core designs divide the air streams with heat conductive plates that are also water permeable to permit for not only heat exchange but humidity exchange.

It is important that the size of a heat exchanger, and in particular, the heat exchanger core, be properly matched to the required air flow and the expected air temperature and humidity conditions. Normally this is accomplished by selecting from among a variety of different pre-manufactured sizes of heat exchangers. Each such heat exchanger includes a different core size and/or combinations of cores. Because of the crossing intake and exhaust air streams which must be channeled separately to the heat exchanger core, different sizes of heat exchanger cores normally require a matching enclosure, unique to that core, so as to maintain the proper air flow and separation. Manufacturing and stocking many different heat exchanger models is expensive and difficult.

SUMMARY OF THE INVENTION

The present invention provides a limited number of parts that may be assembled to create heat exchanger assemblies of arbitrary size. A standard core building block is provided that may be linked with other cores to produce stacks. Multiple stacks can be arrayed to produce a heat exchanger of the proper size. Standardized single and double width panels attach to provide the necessary channeling of air for the crossing fresh and exhaust air streams. The single and double width panels are substantially half the height of the stack and therefore may be positioned to provide proper segregation of intake and exhaust streams on both sides of the heat exchanger unit regardless of its size.

Specifically, then, the present invention provides a kit of parts for a heat exchanger including one or more block shaped cross flow exchanger cores that are stackable in at least two columns within a rectangular volume so that the bases of the cores are diagonal to the faces of the rectangular volume. Single and double width panels having heights less than the heights of the columns are attachable to the edges of the columns to fill in alternating portions of two opposed faces of the rectangular volume. The two panel sizes, when appropriately arranged, provide the necessary separation of intake and exhaust stream.

Thus, it is one object of the invention to provide a limited number of standard parts that can be used to create a wide variety of different heat exchanger sizes.

The cores may have outwardly extending tabs at their edges and the panels may have inwardly extending tabs at their edges, the tabs of the panels being attached to the tabs of the cores by an alignment strip having two slots, one receiving the outwardly extending tabs on the cores and one receiving inwardly extending tabs on the panels. The alignment strip may be a strip of metal folded along its length into an S-shape to provide the first and second slots.

Thus, it is another object of the invention to provide a modular heat exchanger system that can be readily carried in small components to the mechanical equipment area, in or on a building, through standard door openings and assembled there at the job site. The S-shaped strip provides a clamping action holding the cores and panels in place. This attachment may be augmented with fasteners such as sheet metal screws inserted through the strip and tabs locking them in place.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
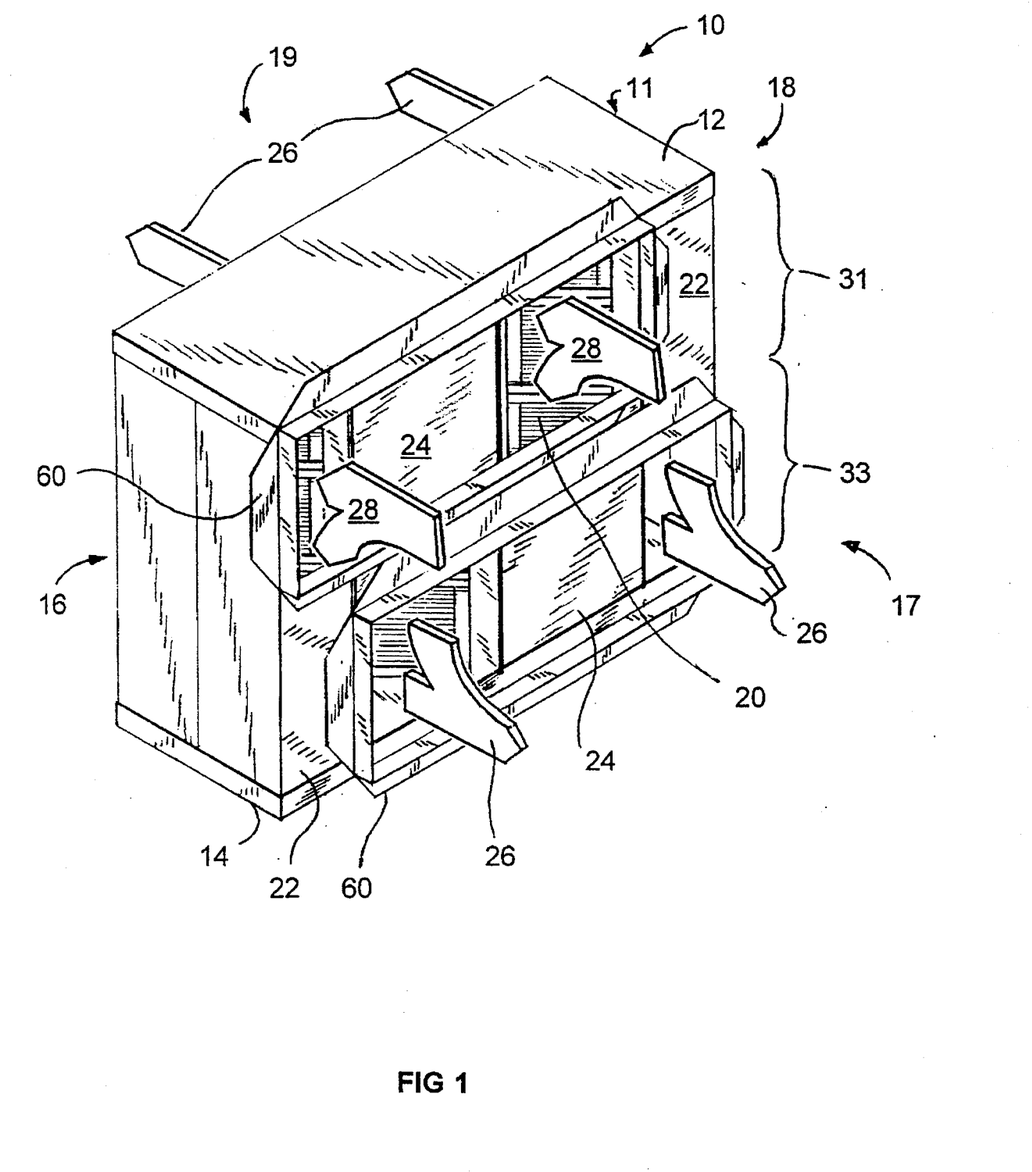
FIG. 1 is a perspective view of a heat exchanger assembled from the components of the present invention showing offsetting of the duct collars to separate crossing intake and exhaust air streams.
Figure 2:
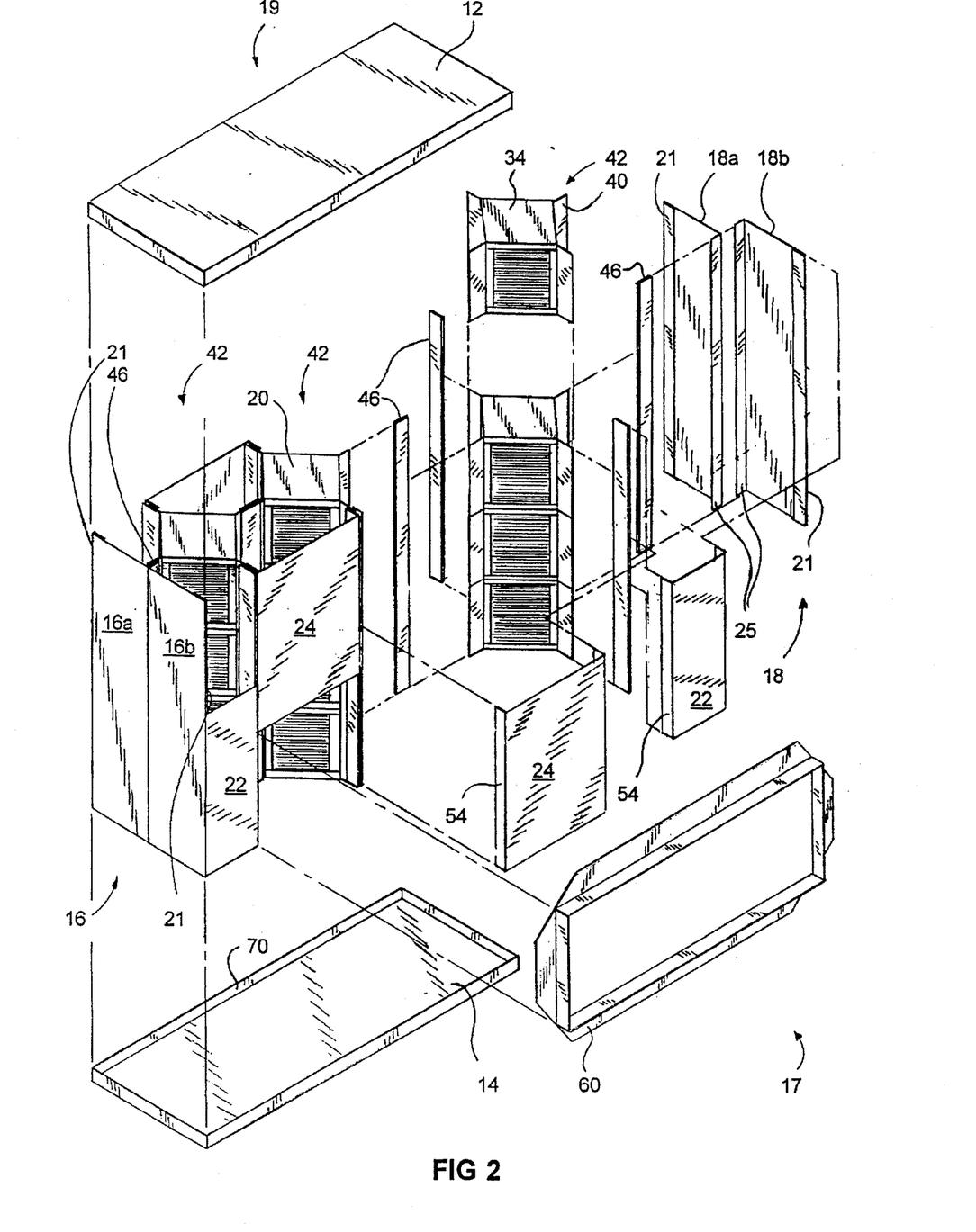
FIG. 2 is an exploded view of the assembled kit of FIG. 1 showing its components including stackable exchanger cores and single and double width panels.

Referring now to FIGS. 1 and 2, an air-to-air heat exchanger 10 includes a housing 11 of sheet steel having a generally rectangular top pan 12 and bottom pan 14 spanned at their left and right edges by end-panels 16 and 18, respectively, and at a front face 17 and rear face 19 with panels 22 and 24 to enclose a generally rectangular volume. The end-panel 18 may be constructed of two rectangular sheets 18a and 18b of width equal to approximately half the depth of the housing 11, measured between the front and rear faces 17 and 19 of the assembled housing 11, which together span the depth of the housing 11. Likewise, end-panel 16 may be constructed of two panels 16a and 16b.

Figure 5:
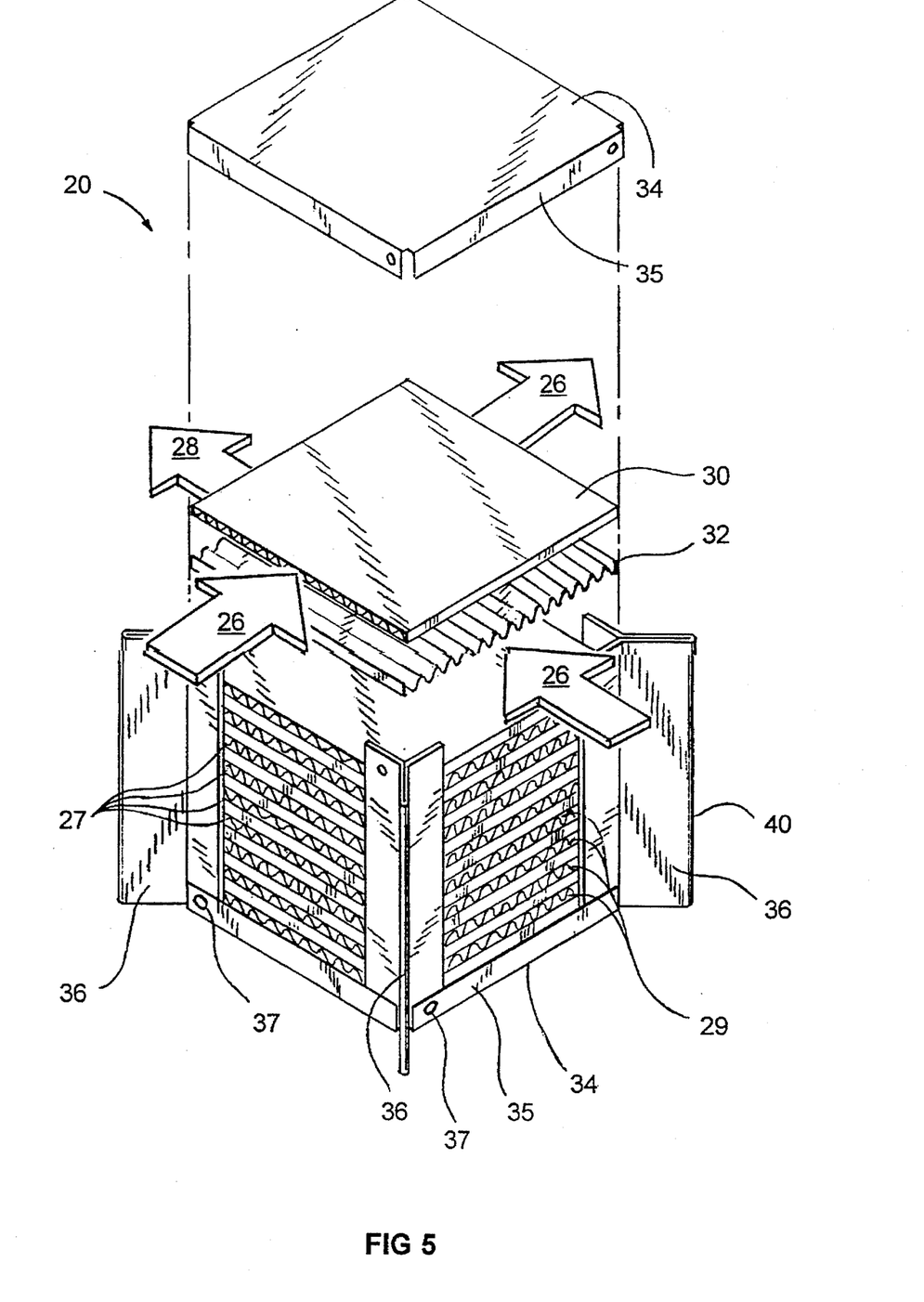
FIG. 5 is an exploded detail view of a single heat exchanger core showing the tabs used for connecting the cores together in a column and via an alignment strip to single and double width plates as shown in FIG. 2.

The housing 11 holds a number of exchanger cores 20 arranged in one or more stacks 42 of one or more core 20. Referring now to FIG. 5, each of the exchanger cores 20 is a cube formed of layered square heat exchanger plates 30 separated by square corrugated spacers 32. While cubical exchanger cores are preferred, rectangular, rhomboid or other geometric shapes are possible as long as the exchanger is a three dimensional block and has crossing air flow paths. The plates 30 and spacers 32 are constructed of an engineering resin composite and serve to divide the intake air stream 26 and exhaust air stream 28 into a plurality of alternating adjacent layers 27 and 29. Each corrugated spacer 32 is rotated by 90° with respect to the spacer 32 above and below it so that layers 27 are directed perpendicularly to layers 29. The intake air stream 26 is received by the odd numbered layers 27 having corrugated spacers 32 aligned to admit the intake air stream 26. Even numbered layers 29 receive the exhaust air stream 28 passing perpendicularly to the intake air stream 26.

The plates 30 are thermally conductive to prevent intermixing of the two streams 26 and 28 but to allow heat transfer between them. In one embodiment of the present invention, the plates 30 also permit the passage of humidity so that both heat and moisture in vapor form may transfer between layers 27 and 29 to conserve the latent heat as well as the sensible heat of the air streams 28 and 26.

Heat exchanger cores of this general design are available from Mitsubishi Electric Corporation, Tokyo, Japan and are sold under the trademark Lossnay.

The collected stack of exchange plates 30 and corrugated spacers 32 form the faces of the cubical core 20 each face of which is generally equal to the area of a single plate 30. The top and bottom base of the core 20 is provided by sheet metal base plates 34 capturing the top most and bottom most stack of plates 30 and spacers 32 within shallow rims 35 extending around the periphery of the base plates 34. The base plates 34 are connected to each other through flanges 36 running along the vertical edges of the cubical core 20 between corresponding corners of the base plate 34. The flanges 36 include an angle channel portion 38 receiving the corners of the plates 30 and spacers 32, as they are layered, thus holding the plates 30 and spacers 32 in alignment between the base plates 34. The flanges 36 also include outwardly extending tabs 40 which project radially from an axis through the center of the plates 30 at each of the four corners of the core 20. The angle channel portion 38 and the tabs 40 may be folded from a single strip of sheet steel. The ends of the angle channel portions 38 of flanges 36 are attached to the rims 35 of base plates 34 by rivets 37.

Figure 3:
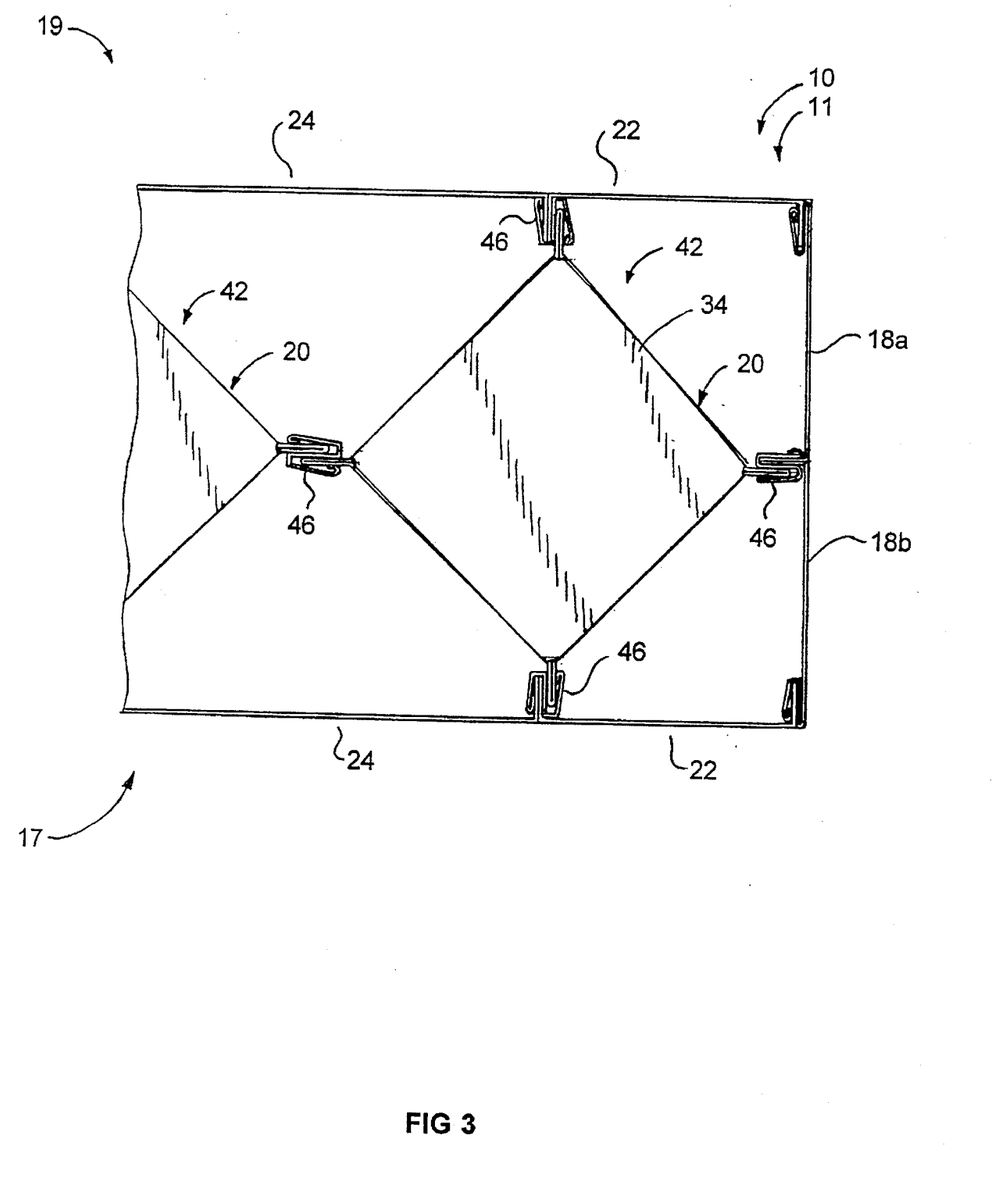
FIG. 3 is a fragmentary top view of the assembled heat exchanger of FIG. 1 showing the connection of panels and heat exchanger cores through interlocking tabs and alignment strips.
Figure 4:
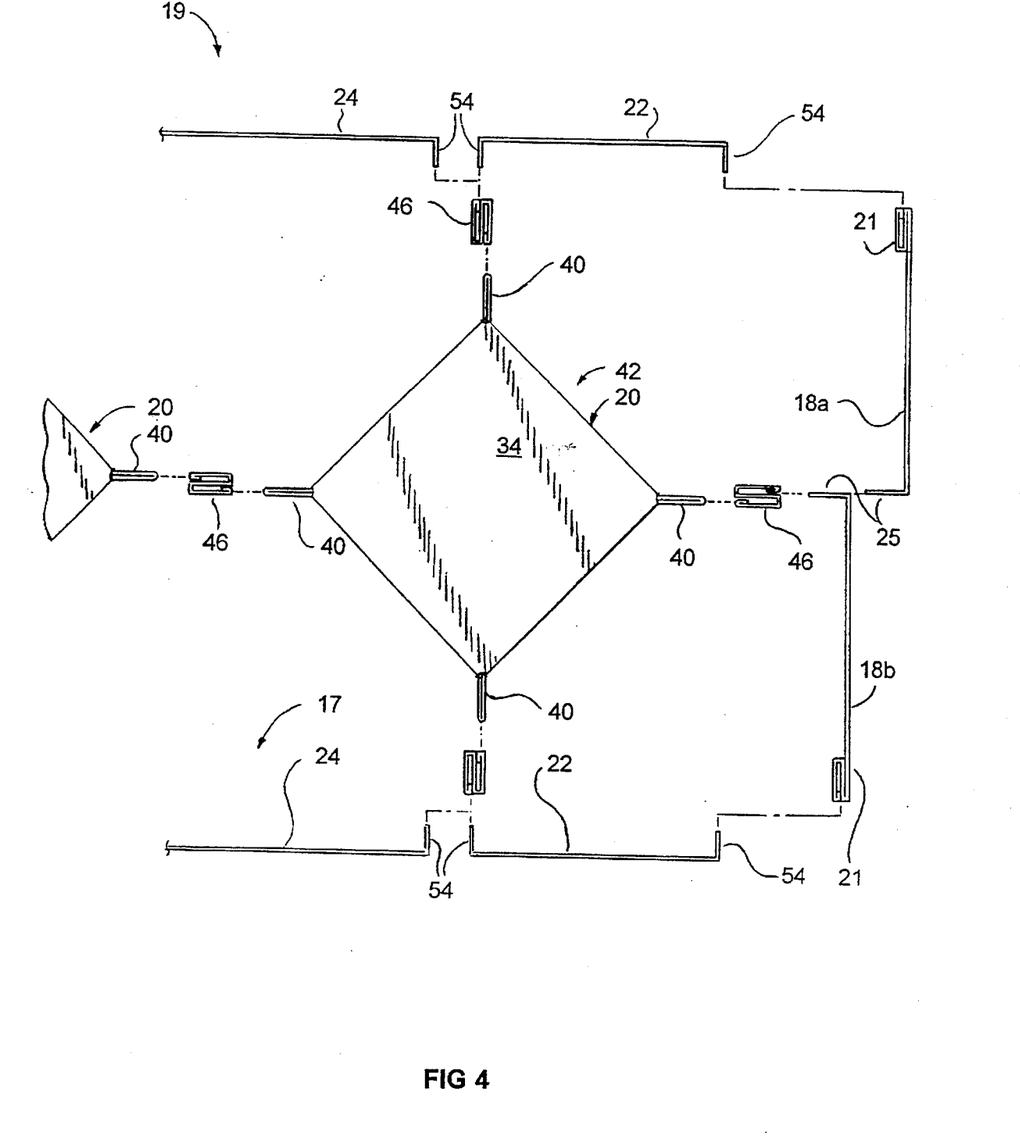
FIG. 4 is a figure similar to that of FIG. 3 for the exploded heat exchanger of FIG. 2.

Referring again to FIGS. 1 and 2, the cores 20 are stacked into stacks 42 and multiple stacks 42 may be placed within the housing 11 so that the edges of the base plates 34 of the cores 20 are diagonal to the front and rear faces 17 and 19 to permit the crossing air streams 28 and 26 to be received by the cores 20 through the front and rear faces 17 and 19, respectively. Referring also to FIGS. 3 and 4, in particular, the edges of the base plates 34 are rotated to an angle of 45° with respect to the front and rear faces 17 and 19 and thus the walls formed by end-panels 16 and 18 and panels 22 and 24. While this 45° angle is preferred for a cubical exchanger core, other angles with respect to the front and rear faces 17 and 19 are also contemplated. In this manner, two of the tabs 40 of the flanges 36 extend toward the front and rear faces 17 and 19 of the housing 11 and two of the tabs 40 of the flanges 36 extend left and right toward the end-panels 16 and 18.

The cores 20 are held in alignment within the stacks 42 with abutting bases aligned by four connector rails 46. Each alignment strip is a ribbon of sheet metal folded along its length to have an S-shaped cross section and thereby to provide two outwardly opposed slots, one of which may receive the tabs 40 of the flanges 36 of each core 20. In this manner the connector rails 46 hold the cores 20 in the stacks 42.

Referring to FIGS. 1, 2 and 3, for the stack 42 closest to the right edge of the housing and thus end-panel 18, one connector rail 46 will abut the end-panel 18. A tab 50 is folded in the inner vertical edges of the sheets 18a and 18b by making a right angle bend along the height of the sheets 18a and 18b to form tabs 25, the tabs 25 being received by a connector rail 46 attached to the stack 42 closest to the end-panel 18. Similar tabs connect the panels 16a and 16b, via a connector rail 46 to a stack 42 closest to the end-panel 16.

Stacks 42 that are not adjacent to either of the end-panels 16 or 18 attach on their left and right to the stack 42 on either side of them by the same connector rails 46. In these cases, the tabs 40 of cores 20 in adjacent stacks 42 are attached together by the connector rails 46.

The outer vertical edges of the panels 16a, 16b, 18a, and 18b are folded along the length of the edges to produce an S-shaped cross section similar to that of the connector rails 46 having slots 21 opening from the front face 17 and rear face 19, respectively. These slots 21 receive tabs from the panels 22 and 24 as will be described.

Figure 6:
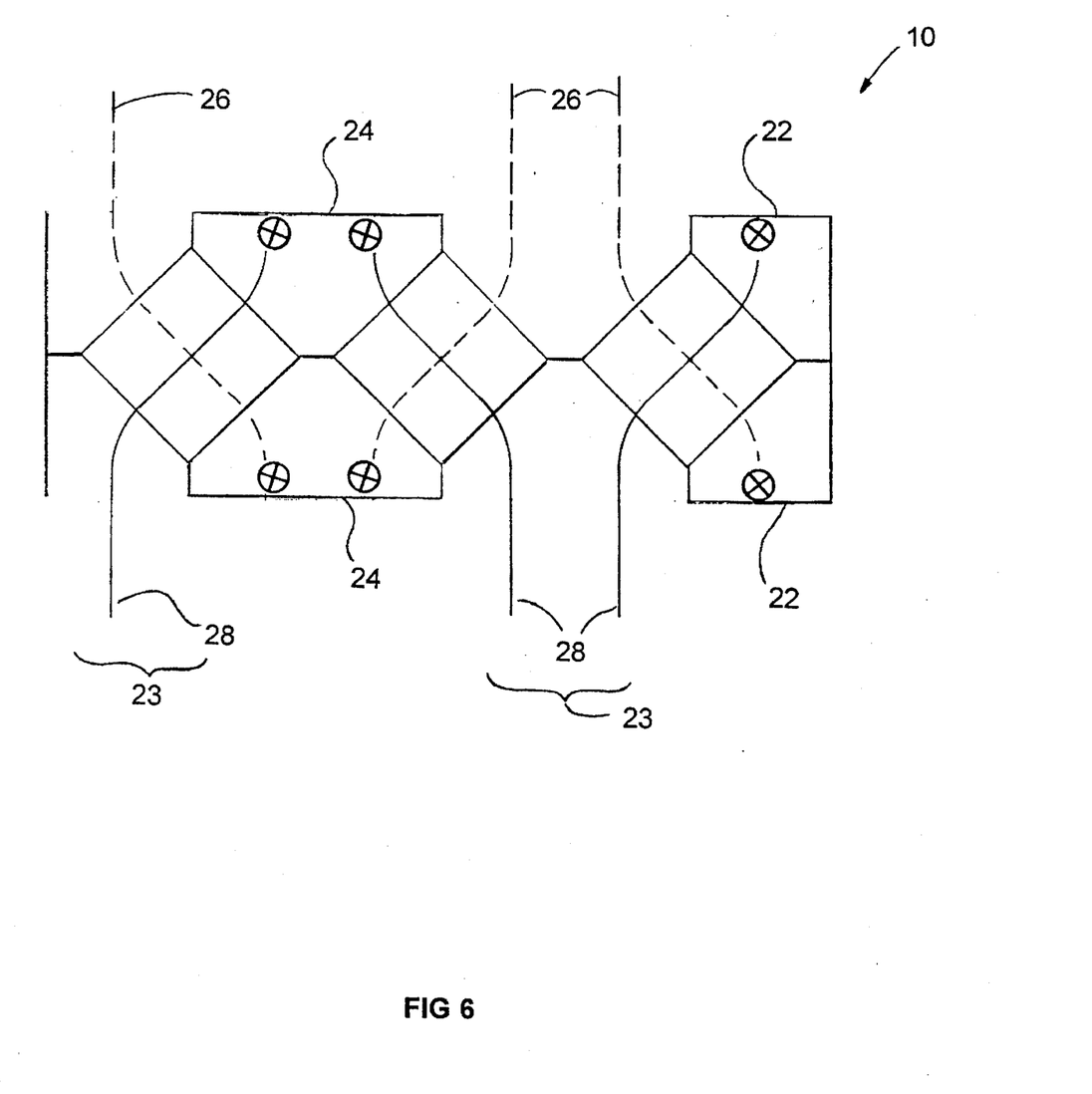
FIG. 6 is a diagrammatic view of the assembled kit showing the flow paths of the respective air streams.

Referring now to FIGS. 3, 4, and 6, the width of the single and double width panels 22 and 24 is selected to match the width of the faces of the cores 20 as projected onto the front and rear faces 17 and 19 of the housing 11 and thus to generally match the width 23 of air flow as it is received by the core 20 in a direction generally perpendicular to the front and rear faces 17 and 19 of the housing 11. The single and double width panels also have their vertical edges folded inward at 90° to provide tabs 54 that may also be received by connector rails 46 attached to the stacks 42 or by the slots 21 in the panels 16a, 16b, 18a or 18b.

Thus, the single width panel 22 has a length between its tabs 54 equal to the separation, measured along the plane of the front face 17 of the housing 11, equal to the distance between tab 40 of the rightmost stack 42 and slot 21 of end plate 18a. These single width panels 22 thus serve to cover the gaps between tabs 40 of the core 20 and the end-panels 16 and 18 of the housing 11 for stacks 42 near either the left or right sides of the housing 11.

The double width panel 24 will be approximately twice as wide as the single width panels 22 serving to span the difference between tabs 40 proximate to the front face 17 or rear face 19 of the housing 11 of adjacent stacks 42.

Regardless of the number of stacks 42, only two panel widths, a single and double panel width, will be required to fill in the front face 17 and rear face 19 of the housing 11 and provide separation of the air streams 28 and 26.

Referring again to FIG. 1, the height of the single and double width panels 22 and 24 is approximately half the total height of the stacks 42 and thus the panels 22 and 24 may be placed exclusively in an upper tier 31 or lower tier 33 of the housing 11, being generally the upper or lower half of the housing 11.

Referring now to FIGS. 1 and 6, the pattern of placement of the single and double width panels 22 and 24 in the upper tier 31 is be exactly the opposite of the pattern of placement of the single and double width panels 22 and 24 in the lower tier 33. On the other hand, the pattern of placement of the panels 22 and 24 on each tier 31 and 33 at the front face 17 of the housing 11 will be exactly the same as the placement of panels 22 and 24 at the rear face 19 of the housing 11 for those tiers.

For example, for the top tier 31, exhaust air stream 28 passes into the housing 11 through the openings left by the absence of a leftmost single width panel and a rightmost double width panel at the front face 17 of the housing 11. Then, upon passing through the cores 20, the exhaust air stream 28 is blocked by a double width panel 24 and single width panel 22 at the rear face 19 of the housing 11 at that tier 31. The air must travel downward to the first tier 33 (indicated by x's in circles) to pass out of openings formed by an absence of single and double width panels at that tier 33. Similarly, the intake air streams 26 passing through cores 20 from the rear face 19 of the housing, after passing through cores 20 at the upper tier 31 are blocked by double width panel 24 or single width panel 22 to the front face 17 of the housing 11 and these air streams must again descend to the second tier 33 to exit from the housing 11.

As mentioned, the height of the single and double width panels 22 and 24 will be approximately half that of the stacks 42 to properly channel the intake and exhaust streams of air on each side of the housing 11. Duct collars 60 having a height equal to the height of one tier 31 or 33 each capture air from one of air streams 28 or 26 on each side of housing so the air may be maintained as a segregated flow when connected to standard ventilation ducts.

The above described modular construction significantly reduces the number of parts needed for air exchangers of an arbitrary size. Only one type of exchanger core 20, the most expensive element, need be stocked. The connector rails 46 may be of one size and easily cut in the field to the proper length. This is true also with the end-panels 18 and the panels 22 and 24.

Yet even if the panels are pre-cut, the number of parts is significantly reduced. For example, a given height of single width panel 22 double width panel 24, and end-panels 16 and 18 can be used for heat exchangers 10 with an arbitrary number of stacks 42 of a given height. Top pan and bottom pan 12 and 14 may remain the same for heat exchangers with a given number of stacks 42 regardless of their height.

The present invention also provides that the heat exchangers need not be assembled in advance as the connection methods described permits their assembly on site without tools beyond those normally carried by heating, ventilation and air conditioning contractors. In particular, the S-shape of the connector rails 46 is formed closed so that insertions of the tabs 40, 54 or 50 causes an outward springing of the connector rail 46 serving to clamp and hold the positions in place without the immediate need for machine screws, the connectors 46 and their respective tabs 40, 50 or 54. A complete locking of this assembly may be obtained by drilling a hole through a connector rail 46 to pierce one or more tabs and lock them into place.

Once the heat exchanger 10 is assembled on site by the insertion of tabs 54, 50 and 40 into their respective connector 46, the top and bottom pans 12 and 14 may be placed over and under that assembly, the pans 12 and 14 having lips 70 which extend inward to cover and overlap the upper and lower edges of the end-panels 16 and 18 and 22 and 24. Holes may be drilled through these overlapping portions and sheet metal screws inserted to rigidly lock the structure into place.

Referring again to FIGS. 1 and 2, after the pans 12 and 14 are in place on the housing 11, the duct collars 60 may be installed over each of the tiers at the front and rear face 17 and 19 of the housing 11 to maintain the segregation of the intake air streams 26 and exhaust air streams 28. The duct collars 60 are then attached to other ducting in the heating or air conditioning system.

Generally, as the capacity of the heat exchanger 10 increases the duct size and hence the size of the duct collar 60 must also increase. However, the number of duct collars that need be stocked can be minimized by the use multiple columns for either the input or exhaust streams for larger heat exchanger units.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A kit of parts for a heat exchanger comprising:
   block shaped cross flow exchanger cores stackable to heights in at least two columns within a rectangular volume so that bases of the cores are diagonal to faces of the rectangular volume, the cores having outwardly extending tabs;
   alignment strips attachable to the tabs on the cores to hold the cores into alignment in columns;
   single and double width panels of a height less than the height of the columns to fill alternating portions of two opposed faces of the rectangular volume, the panels having inwardly extending tabs attachable to the alignment strips when the alignment strips are attached to the core stacks; and
   whereby a heat exchanger having an arbitrary number of cores and segregated, crossing, intake and exhaust air streams may be assembled, said rectangular volume being defined by a set of end plates and top plates and said panels.

2. The kit of claim 1 wherein the panels have inwardly extending tabs and wherein the alignment strips have two longitudinal slots, one slot to receive the outwardly extending tabs on the cores and one slot to receive the inwardly extending tabs on the panels.

3. The kit of claim 1 including four duct collars channeling the passage of air through an area having a height less than half the height of the columns and a width substantially equal to the width of the face of the rectangular volume, minus the width of a single width panel.

4. A kit of parts for a heat exchanger comprising:

a rectangular top and bottom pan each having front and rear edges each defining an exchanger width, the top and bottom pan to be separated from each other by a core stack distance to define a rectangular volume having opposing faces between the front and rear edges of the top and bottom pan;

at least two heat exchanger cores being rectangular prisms and having bases sized to fit in the pans with edges of the bases diagonal to the edges of the pans, the edges of the bases, when so positioned, presenting an air-flow width measured along the front and rear edges of the pans, the cores further having outwardly extending tabs running between the bases along edges of each of the cores;

a set of panels having widths equal to one and two times the air-flow width of the cores and heights less than the stack distance and having inwardly extending tabs running upward along opposed edges separated across their width;

a connector rail extending the stack distance to join the tabs of the cores when the cores are arranged in stacks with tabs of the panels so that the cores are held alignment stacks, the panels being supported by the cores to form alternating portions of the two opposing faces of the rectangular volume;

whereby a heat exchanger having an arbitrary number of cores may be assembled, said rectangular volume being defined by the top and bottom pair, a set of end plates and the panels.

5. The kit of claim 4 wherein the connector rail is a strip of sheet metal folded along its length in an "S" shape to provide the first and second outwardly opposed slot.

6. The kit of claim 4 including end-panels having a width of two times the air flow width and a height substantially equal to the stack distance.

7. The kit of claim 4 including four duct collars channeling the passage of air through an area having a width substantially equal to the exchanger width minus the air flow width.

* * * * *